Jan. 28, 1964 J. LE VACHER 3,119,253
APPARATUS FOR MEASURING THE COAGULATION TIME OF BLOOD
Filed Dec. 28, 1961 2 Sheets-Sheet 1

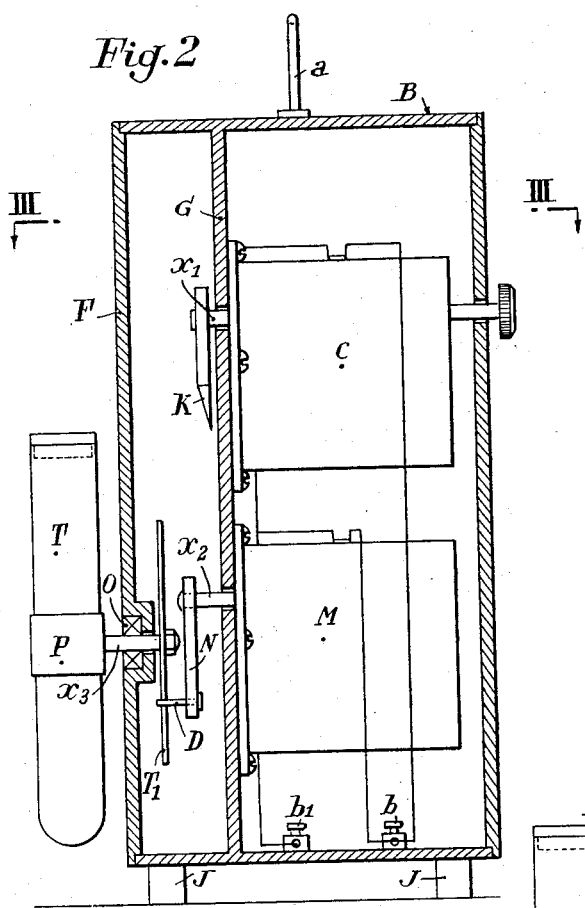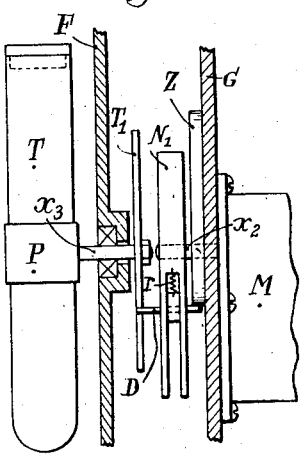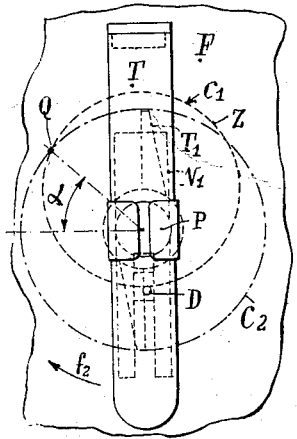

United States Patent Office 3,119,253
Patented Jan. 28, 1964

3,119,253
APPARATUS FOR MEASURING THE COAGULATION TIME OF BLOOD
Jacques Le Vacher, 66 Quai de l'Odet, Quimper, France
Filed Dec. 28, 1961, Ser. No. 162,845
Claims priority, application France Dec. 28, 1960
5 Claims. (Cl. 73—53)

This invention relates to apparatus for measuring the coagulation time of blood.

It is known that blood, in a liquid state, when exposed to air undergoes an irreversible clotting process. The coagulation time varies according to individuals and to their state of health.

It is an object of the invention to provide an apparatus for automatically measuring this time of coagulation.

The principle of operation of the apparatus according to the invention is as follows:

An analysis tube is filled to half its capacity with the blood to be tested.

This tube is secured intermediate its ends on a horizontal shaft so that it can rotate freely in either direction about the shaft axis. The tube closed by a plug is firstly in vertical equilibrium with the blood contained in its lower portion. Then the tube is rotated slowly for example in one direction. When the tube half containing the blood reaches an elevation above the horizontal, the blood flows from one end of the tube to the other end and if at this moment the tube is released, the blood will continue by gravity to rotate the tube in the same direction of rotation until the initial condition of equilibrium is resumed, with the blood filling the lower half of the tube. The same cycle is resumed and repeated as long as the blood is liquid and the rotation is maintained.

When the blood has coagulated and the tube reaches an elevation above the horizontal, the blood does not flow from one end to the other end. If at this moment the tube is released, the clotted blood by gravity causes the tube to tilt in the reverse direction.

Thus, the blood coagulation time can be determined with precision by measuring the time period elapsing from the moment the rotation was started in one direction to the moment the tube tilted in the opposite direction.

To this end the apparatus according to this invention comprises a test or analysis tube filled to half its capacity with the blood to be tested, a low-speed micromotor and a minute-counter both adapted to be driven simultaneously and electrically. The motor drives the tube in one direction, and means is provided for causing the tube to rotate in the opposite direction while actuating a contact breaker inserted in the energizing circuit of the motor and minute-counter when the blood has coagulated in the tube.

According to a preferred embodiment of the invention, this apparatus comprises a minute-counter and a micro-motor both adapted to be started electrically and simultaneously, the motor speed being of the order of 1 revolution per minute and its shaft being disposed horizontally, a test tube clamped intermediate its ends in a clamp having its rod engaged horizontally and free to rotate in a ball-bearing, an arm secured intermediate its ends on the rod end at right angles to the rod, a supporting member rigid with the micro-motor shaft, a horizontal pin mounted on said supporting member so as to be eccentric in relation to the motor shaft and to describe a circular path when the motor is running, the pin end, when the apparatus is inoperative, bearing on said arm so as to cause the rotation in one direction of said arm and therefore the test tube when the motor and simultaneously the minute-counter are started, means for causing said arm to escape from said pin when the tube during its rotation is above the horizontal so that the tube is subsequently left free, and a circuit-breaking lever so arranged as to be actuated by said arm in the direction to break said energizing circuit of said micromotor and minute-counter when the tube freed from the pin action revolves in the direction opposite to a direction in which it was driven by said pin, when the blood filling about half the tube capacity has coagulated to form a clot.

According to a simpler embodiment, the shaft of the micro-motor and the rod of the tube clamp are parallel to each other and in a common vertical plane.

The aforesaid arm may be caused to escape from said pin by shifting the shaft of the micro-motor upwards in relation to the clamp rod, and also by so positioning the pin in relation to the lower end of the arm in the bottom dead center that the circular paths of the pin at its point of contact with the arm and of the lower end of the arm intersect each other when the tube carried along by the pin has been raised above the horizontal, the path of the pin overlying that of the arm in this case.

Other means comprise a fork-shaped pin carrier, the pin being adapted to slide between the fork prongs against the resistance of a return spring, and also of a fixed disc eccentered by being shifted upwards in relation to the motor shaft so that its uppermost point overlies the upper end of the arm in the vertical position, the edge of this disc guiding the pin end opposite to that bearing on the arm, whereby the pin will slide on the arm until it leaves same when, as in the preceding case, the circular paths of the pin and of the arm end intersect each other.

Irrespective of the means utilized, when the arm and therefore the tube are released above the horizontal the weight of the blood contained in the tube carries along the latter to complete its half-revolution so that it resumes its vertical position. The pin continues a complete revolution at the very low speed of the micro-motor before again contacting the arm, whereafter the same cycle is repeated, until the blood coagulates and remains in the tube bottom so as to tilt the tube in the opposite direction.

The circuit breaker may consist of a lever having one arm provided with an auxiliary arm pivoted thereon so as to be raised by said lever arm and to permit its movement when it rotates in one direction, before the blood has coagulated, and to act as a fixed stop solid with the lever which is engaged by the arm to tilt the lever and open the circuit when it pivots in the opposite direction when the blood has coagulated.

Specific forms of embodiment will now be described by way of example with reference to the attached drawings.

In the drawings:

FIGURE 2 is a diagrammatic vertical axial section of the embodiment shown in FIG. 1;

FIGURE 4 is a fragmentary diagrammatic elevational view showing an alternate embodiment, and FIGURE 5 is a fragmentary diagrammatic axial sectional view of the embodiment shown in FIG. 4.

The apparatus according to this invention comprises a plastic casing B having a transparent front face F acting as a support for a rotary clamp P carrying the test tube T.

Inside the casing B an electrical micro-motor M and an electrical minute-counter C are secured by means of screws on a vertical partition G parallel to the front face of the casing.

The minute-counter, micro-motor and rotary clamp have their shafts $x_1$, $x_2$ and $x_3$ disposed horizontally and superposed in a common vertical medial plane.

Figure 3:
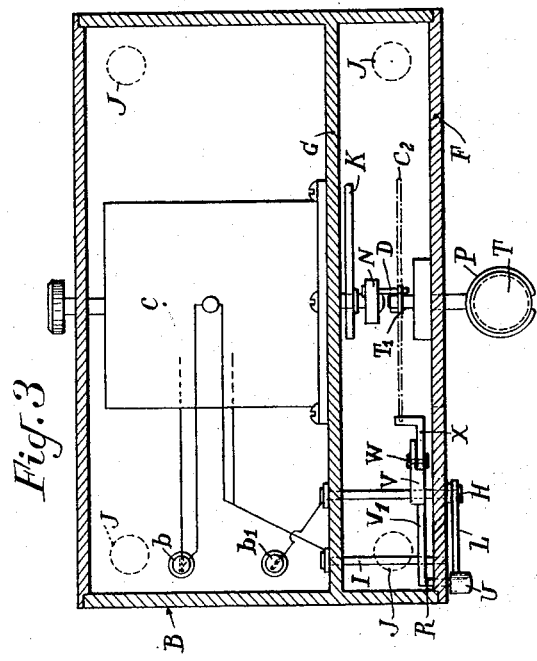
FIGURE 3 is a section taken along the line III—III of FIG. 2.

Secured on the same front face F of the casing is a circuit-breaking lever L having its shaft H and stop I inserted in the electric circuit for energizing the micro-motor M and minute-counter C (see FIG. 3). This lever can oscillate in the plane of said face F from the ON position M to the OFF position A.

In addition to the apparatus described in detail hereinafter, the casing encloses two terminals $b$, $b_1$ for supplying electrical current to the apparatus, as well as four rubber pads J for absorbing vibration, and at its top a ring $a$ for transporting the apparatus.

The minute-counter C consists of an electrical apparatus in the form of a synchronous motor fed with 127-volt or 220-volt, 50-c.p.s. current, which rotates at two revolutions per hour and drives a pointer K before a dial graduated from 0 to 30 minutes. The pointer may be reset by means of the knob shown as emerging from the rear of the apparatus.

The micro-motor M is a synchronous motor fed with 127-volt or 220-volt, 50-c.p.s. current, which rotates at one revolution per minute and drives a horizontal pin D secured at right angles to the end of a supporting arm N rigid with the shaft $x_2$. The pin D may also be reset to zero, i.e., restored to its lowermost position by releasing the circuit-breaker arm or lever L to its ON position M until the said pin D has resumed its lower most position, which is seen through the front transparent face F or casing B; at this time, the current supply is discontinued or cut-off by moving the control arm L to the OFF position A.

The rotary steel clamp consists of a pair of arcuate spring arms and is secured on one end of a horizontal rod $x_3$ adapted to revolve freely in a ball-bearing O fitted in a cavity formed in the front face F of the casing. The test tube T is clamped intermediate its ends by the clamp P.

At the opposite end of shaft $x_3$ and at right angles thereto an arm $T_1$ is secured intermediate its ends on this shaft and constantly occupies positions related to the positions of tube T while remaining co-planar thereto. The lower half of this member $T_1$ is alternately engaged by the pin D of the micro-motor, during the operation of the apparatus, whereby the motor rotation ensures the regular rotation of arm $T_1$ and therefore of the tube to be tested.

If this pin D and the end of arm $T_1$ describe eccentric circular paths, at a certain time the driving engagement between D and $T_1$ is discontinued and $T_1$ is released so that it can tilt freely and independently of the micro-motor in one or the other direction.

The eccentricity of D is obtained as follows, with reference to FIGS. 1 to 3.

D is rigid with respect to shaft $x_2$ and describes about same a circular path. As the axis of shaft $x_2$ is vertically coplanar with, but overlies the axis of shaft $x_3$, (the relative distance between these axes being for example a few millimeters), pin D will describe a circular path $C_1$ eccentric in relation to that $C_2$ described by $T_1$ (FIG. 1). The two circular paths intersect each other initially at Q, when the tube T has moved above the horizontal through an angle α at the time the distance from pin D to the axis of $T_1$ becomes greater than the radius of the circular path described by the end of $T_1$. Then $T_1$ can oscillate in one or the other direction.

The glass tube T containing the blood to be tested is closed by a light rubber plug (or a plastic cap) and is of the conventional test type, that is: either an 80-millimeter long tube with a 12-millimeter O.D., or a 90-millimeter long tube with a 15-millimeter O.D.

A reference line (not shown) across the tube shows the middle thereof.

The electric supply conductors are connected to the terminals $b$ and $b_1$ of the apparatus. The first terminal $b$ is connected to one feed wire of the micro-motor and one feed wire of the minute-counter (the wire ends being twisted together) while the two other feed wires twisted together are connected to the circuit-breaker lever L through the pivot pin H thereof, as well as to the stop I of this lever. In the ON position M, the weight of the lever L closes, simply by gravity, the circuit between the stop I and the lever shaft H electrically connected to terminal $b_1$. The current flowing from $b$ to $b_1$ through the circuit breaker, micro-motor and minute-counter energizes the electromotors to cause their synchronous rotation.

In the inoperative or OFF position A, the contact is broken and as the energizing circuit is open the two motors are stopped.

The lever L is pivoted on the horizontal shaft H mounted as a distance-piece between the transparent front face F of the casing and the intermediate partition G. The stop I consists of a horizontal rod mounted in the same manner but at a higher level. This lever L disposed behind the front face F of the casing is so welded that its arm V nearest to the arm $T_1$ lies horizontally in the ON position of the lever.

The other arm $V_1$ carries on its free end, through a short rod R extending through an arcuate slot S formed in the wall F, a knob U of insulating material which projects from the front face F of the casing, whereby the operator may move the lever L from the inoperative or OFF position shown in chain-dotted lines, to the ON position shown in thick lines. The lever L is preferably formed with a parallel arm of insulating material which lies on the outer side of face F between the shaft H and knob U.

The lever arm V has pivoted thereon at W, near its outer end, an auxiliary arm X constituting an extension having its end portion bent at right angles away from face F so as to project into the path of the aforesaid arm $T_1$ shown in chain-dotted lines in FIG. 3. This auxiliary arm X is prevented from pivoting downwards by a stop Y rigid with the arm V, as shown. On the other hand, this auxiliary arm X can pivot upwards in the direction of the arrow $f_1$ to the position shown in chain-dotted lines in FIG. 1; in this position, the auxiliary arm X cannot interfere with the circular path of arm $T_1$.

This apparatus operates as follows:

The operator resets the minute pointer K and the pin D, and the tube T filled with the blood to be tested is clamped intermediate its ends in the steel clamp P, the blood filling only the lower half of the tube; then the circuit-breaker lever L is moved to its ON position, and energizing current is delivered to the motors.

Figure 1:
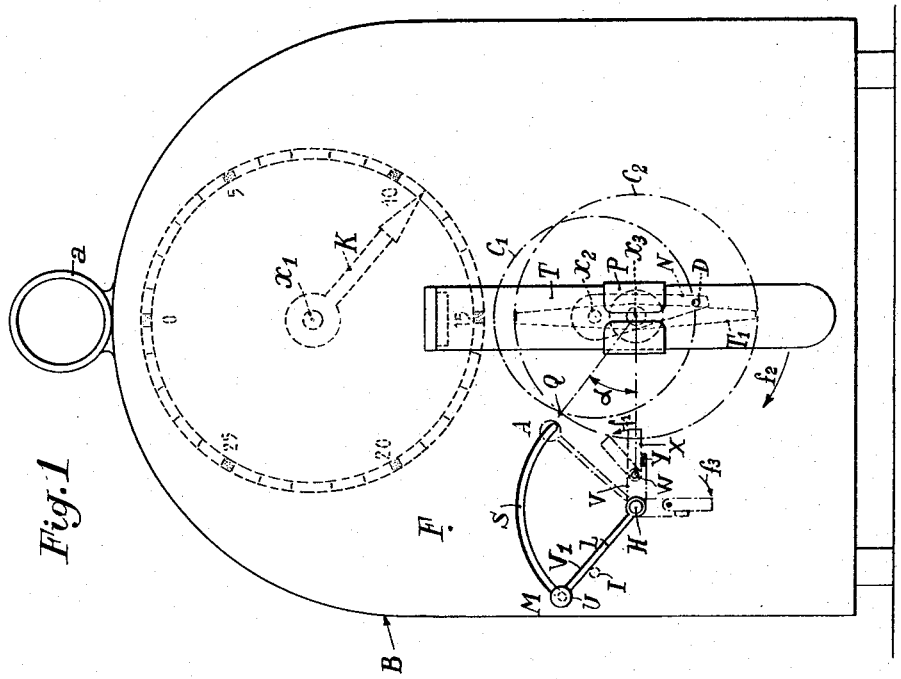
FIGURE 1 is a diagrammatic elevational view of an embodiment according to this invention.

The following movements are subsequently obtained:

The pin D, during its rotation, engages the lower portion of arm $T_1$ and carries this arm as well as the tube T therewith in the clockwise direction, as shown by the arrow $f_2$ in FIG. 1. When the tube half filled with blood reaches an elevation above the horizontal the blood flows from one end to the other end of the tube and the weight of the blood accelerates the rotation in the same direction, so that arm $T_1$ moves ahead of the pin D. The tube resumes its initial position of equilibrium with the blood in its lower portion, until pin D carries along $T_1$ during the next revolution, and so forth as long as the blood remains liquid and the movement is sustained. It will be noted that the tube T and arm $T_1$ accomplish only half a revolution while the pin D accomplishes a complete revolution.

The blood flows during the relatively long stop in the position of equilibrium. When it has coagulated completely, the clot remains in one end of the tube and under these conditions it cannot accelerate the clockwise rotation since the blood does not flow to the opposite end. Therefore, the tube T continues to be driven by $T_1$ until the latter is released. At this time the weight of the clot causes the tube to tilt in the opposite direction. Then member $T_1$ acts upon the circuit-breaker lever L through the medium of the auxiliary arm X engaging the stop Y, and the lever is rocked in the direction of the arrow $f_3$ to the position A shown in chain-dotted lines, thus opening the energizing circuit of the micro-motor and minute-counter. By simply reading the dial of the minute-counter, the operator will know the exact time period elapsed from the beginning of the movement until the blood has coagulated.

If the coagulation is not completed, small clots will be transferred with the blood mass to the other end of the tube and the stoppage takes place at the next half-revolution when the complete mass has coagulated. If the blood coagulates completely during the ascending movement in the normal direction of rotation, the tilting movement takes place immediately and gives the desired information. The blood cannot coagulate during the descending movement which is relatively rapid (of the order of one second).

The radius of the circle described by the pin D and the length of arm $T_1$ are so determined that the tube tilts backwards before the clot may release itself from the tube bottom. To this end the angle $\alpha$ is less than 45°.

The auxiliary arm X of lever L is lifted in the direction of the arrow $f_1$ by the arm $T_1$ during its rotation in the clockwise direction, without any inconvenience regarding the general motion and the passage of current.

FIGS. 4 and 5 illustrate an alternate embodiment incorporating means for releasing the arm $T_1$ from the driving action of pin D when the tube T during its half-revolution in the normal direction of rotation $f_2$ has moved above the horizontal.

In this structure the shaft $x_2$ of micro-motor M is in axial alignment with the rod $x_3$ of clamp P, this rod constituting the shaft carrying the arm $T_1$. The pin D is mounted on a support $N_1$ secured on the end of shaft $x_2$ and of forked configuration. The pin D is adapted to slide between the prongs of this fork and to this end it is connected to the bottom of this fork by a return spring $r$. The fork $N_1$ is rotatably driven past a disc Z secured, for example, by cementing or the like, on the front face of partition G in an eccentric position, that is, by being shifted upwards in relation to the axis of $x_2$ extending freely through the disc. The top dead center of the disc is located above the uppermost point of arm $T_1$.

The fork $N_1$ is secured as close as possible to the disc Z without contacting same so that the sliding pin D of which the rear end engages the disc edge may follow the peripheral contour of this disc when the motor M rotates; thus, this pin may describe a circular path which is eccentric in relation to the axis of $x_2$ of the motor and centered on the axis of disc Z.

As in the preceding case the pin D bears with its front end on the arm $T_1$, the latter having if desired a different shape in comparison with the embodiment of FIGS. 1 to 3, the circular path $C_1$ described by this pin being shifted upwards in relation to the circular path $C_2$ described by the end of arm $T_1$. The two circular paths intersect each other at Q when the tube T is above the horizontal by an angle $\alpha$ which is less than 45°. At this position the pin D leaves the arm $T_1$ and moves over same. In other words, when the distance from pin D to the axis of $x_2$ exceeds the radius of the circular path described by the end of the arm $T_1$, the latter is released and may oscillate in either direction.

In either forms of embodiment illustrated, the relative dimensions of the movable component elements are the same so that the tube is driven and released at the same moments.

The operation of the apparatus according to this alternate embodiment is exactly the same as that of the apparatus described with reference to FIGS. 1 to 3.

Of course, various modifications and variations may be made on the apparatus of this invention without departing from the spirit and scope of the invention as set forth in the appended claims; thus, notably, the means for releasing, at the proper time, the tube driving arm may differ from the structure shown and described herein without departing from the basic principles of the invention.

What I claim is:

1. An apparatus for measuring the blood coagulation time which comprises a casing having a vertical transparent front face and an inner vertical partition parallel to said front face, a low-speed electrical micro-motor and an electrical minute-counter both mounted above each other behind said partition and having horizontal shafts extending through said partition, the shaft of said minute-counter carrying an index pointer adapted to move in front of a dial graduated in minutes and visible on said partition, an energizing circuit for said micro-motor and minute-counter, a lever-type circuit breaker mounted behind said front face but adapted to be operated from outside said casing, said circuit breaker being inserted in the energizing circuit of said micro-motor and minute-counter adapted to be started and stopped simultaneously, a test tube adapted to be filled to about half its capacity with the blood to be tested, a spring clamp adapted to clamp said tube intermediate its ends and carried by a rod extending at right angles to the axis of the clamped tube, a ball-bearing mounted in said front face, in front of and in alignment with said micro-motor, said clamp rod engaging said ball-bearing so as to revolve freely therein, the inner end of said rod extending inside said casing and carrying an arm secured intermediate its ends on said rod end so as to extend at right angles thereto, a supporting member rigid with the projecting end of the micro-motor shaft, a horizontal pin mounted on said supporting member so as to be eccentric in relation to the axis of the motor shaft and to describe a circular path when said motor is rotating, the free end of said pin engaging said arm when the apparatus is inoperative so as to carry along said arm and therefore said test tube for rotation in one direction when said motor and simultaneously said minute-counter are started, and means whereby said arm escapes from said pin when the tube, during its rotation, is above the horizontal, so that the tube is released, said circuit-breaking lever being adapted to be actuated by said arm in the circuit-breaking direction to de-energize said motor and said minute-counter when said tube freed from the driving action of said pin revolves in the direction opposite to the direction in which it was driven by said pin, when the blood filling about one-half of said tube has coagulated into a clot.

2. An apparatus as set forth in claim 1, wherein the axis of the micro-motor shaft and the axis of said clamp rod are parallel to each other in a common vertical plane.

3. An apparatus as set forth in claim 2, wherein said micro-motor shaft lies above said clamp rod.

4. An apparatus as set forth in claim 2, wherein the axis of the micro-motor shaft is in axial alignment with said clamp rod, and said means for enabling said arm to escape from said pin comprises a fork-shaped pin-supporting member, said pin being engaged between the prongs of said fork-shaped member and being urged therein by return spring means so as to slide therein against the resistance of said spring means, and a disc secured on said partition in an eccentric position above the axis of the motor shaft, whereby its uppermost point overlies the upper end of said arm in the vertical position, the edge of said disc guiding the end of said pin which is opposite to that engaging said arm, whereby said pin slides along said arm until it leaves same when the circular paths of said pin and of the end of said arm intersect each other, when the tube rotatably driven from said pin is above the horizontal so that the path of said pin overlies that of said arm.

5. An apparatus as set forth in claim 1, wherein one arm of said circuit-breaking lever comprises an auxiliary arm pivoted on said lever arm so as to be lifted by said pin-driven arm and to permit its passage when it revolves in one direction before the blood has coagulated, and to constitute a fixed stop rigid with said lever which is engaged by said pin-driven arm to tilt said lever and break the circuit when it rotates in the direction opposite to said one direction after the blood has coagulated.

References Cited in the file of this patent

UNITED STATES PATENTS

| | | |
|---|---|---|
| 2,478,785 | Shapiro | Aug. 9, 1949 |
| 2,926,519 | Setterberg | Mar. 1, 1960 |
| 3,020,748 | Marshall et al. | Feb. 13, 1962 |